United States Patent [19]
Färlind

[11] 3,982,769
[45] Sept. 28, 1976

[54] SAFETY BELTS
[75] Inventor: Stig Axel Göran Färlind, Monsteras, Sweden
[73] Assignee: Stece - AB Industrifjadrar, Monsteras, Sweden
[22] Filed: Jan. 31, 1975
[21] Appl. No.: 545,913

[30] Foreign Application Priority Data
Feb. 13, 1974 Sweden .............................. 7401886

[52] U.S. Cl. ................................ 280/744; 297/389
[51] Int. Cl.² ..................... A62B 35/00; B60R 21/10
[58] Field of Search ............... 280/150 SB; 297/389; 24/77, 197

[56] References Cited
UNITED STATES PATENTS
3,876,249  4/1975  Nilsson .............................. 297/389

Primary Examiner—Robert R. Song
Attorney, Agent, or Firm—Karl W. Flocks

[57] ABSTRACT

In a three-point type safety belt in which the lap and diagonal belt straps in the position of the belt as fastened extend in V configuration transversely of the vehicle, the diagonal belt strap on one side of the seat of the vehicle is movably passed through a deflection fitting fixed to said one side, and from the deflection fitting the diagonal belt strap runs into a belt retracting device which exerts a yielding pull on the belt. The lap belt strap is fixed on said one side to the seat or to the vehicle. At the apex of the V configuration the belt is movably passed in such a way through two spaced openings in a buckle member that the portion of the buckle member between the openings therein constitutes a bar located at the V apex and extending transversely of the belt. The buckle member which is detachably connectable with a coupling means disposed on the other side of the vehicle seat, is so configured that the portions thereof formed with the spaced openings make an angle with one another, the bar being located at the angle apex. The belt is passed through the openings in such a way that it will be situated on the side of the bar facing away from the angle apex, whereby the buckle member is easily moved along the belt at least when, upon retraction of the diagonal belt strap, the buckle member reaches the deflection fitting.

6 Claims, 3 Drawing Figures

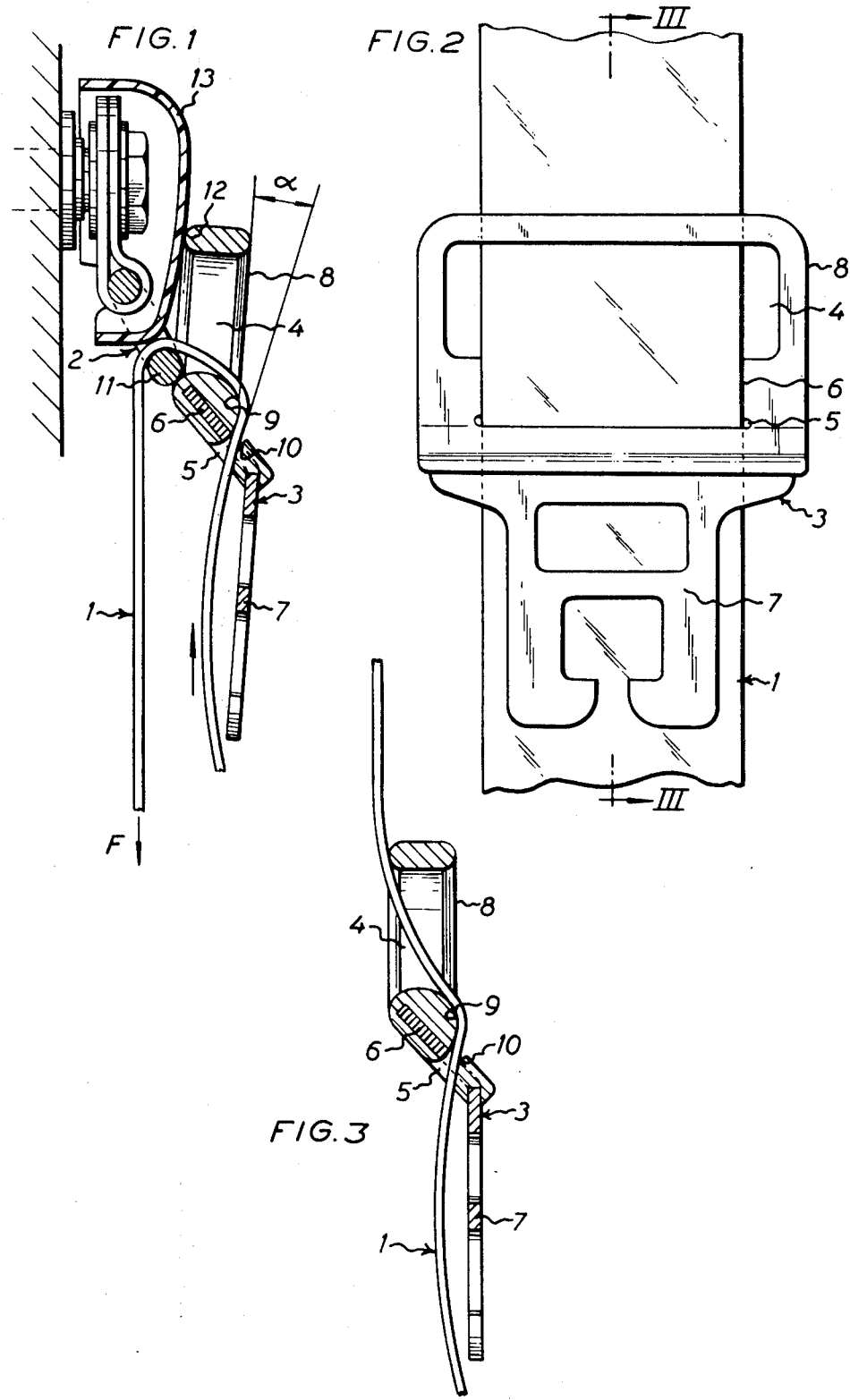

SAFETY BELTS

The invention relates to a safety belt, preferably of the three-point type, the lap and diagonal straps of which in the position of the belt as fastened extend in V configuration transversely of the vehicle, said diagonal belt strap on one side of the seat of the vehicle being movably passed through a deflection fitting fixed to said one side, from where said strap runs into a belt retracting device which exerts a yielding pull on the belt, while said lap belt strap is attached on said one side to the seat or to the vehicle, the belt at the apex of the V configuration being movably passed, in such a way through two spaced openings in a buckle member that the portion of the buckle member between the openings therein forms a bar located at the V apex and extending transversely of the belt, said buckle member being detachably connectable with a coupling means disposed on the other side of the vehicle seat.

According to the invention, the buckle member is so configured that the portions thereof formed with said spaced openings, make an angle with one another, said bar of the buckle member being located at the angle apex, the belt being passed in such a way through said openings that it will be situated on the side of the bar facing away from the angle apex, whereby the buckle member is easily moved along the belt at least when said buckle member, upon retraction of the diagonal belt strap, reaches the deflection fitting.

The invention will be more fully described hereinbelow and with reference to the accompanying drawing which illustrates an embodiment of the buckle member in various operative positions.

In the drawing:

FIG. 1 is a vertical cross-section of the buckle member and a deflection fitting for the belt strap passing through the buckle member;

FIG. 2 is a front view of the buckle member with a belt strap extending therethrough; and FIG. 3 is a section on line III—III in FIG. 2.

The safety belt is primarily intended for use in automotive vehicles, seacraft, aircraft etc. The safety belt 1 is of the three-point type and thus comprises lap and diagonal belt straps which in the position of the belt as fastened extend in V configuration tranversely of the vehicle. The diagonal belt strap on one side of the seat of the vehicle is movably passed through a deflection fitting 2 fixed to said one side, from where it runs into a belt retracting device (not shown). Said belt retracting device preferably is a roll-up mechanism which by spring force tends to pull the belt 1 in the retracting direction. The lap belt strap has its free end fastened to the seat or to the vehicle on the same side as the fitting 2.

At the V apex the belt 1 is movably passed through two spaced openings 4 and 5 in the buckle member 3 in such a way that the portion of the buckle member 3 between said openings 4 and 5 constitute a bar located at the V apex and extending transversely of the belt 1. The buckle member 3 which is connected in the manner indicated with the belt 1 is detachably connectable with a coupling means disposed on the other side of the vehicle seat. As illustrated in the drawing, the buckle member 3 has a tongue 7 for insertion into said coupling means which is a releasable buckle body formed with a recess or pocket for accommodating the tongue 7.

As will best be seen from FIGS. 1 and 3, the buckle member 3 is so configured that the portions thereof formed with the spaced openings 4 and 5, make an angle with one another, the bar 6 being located at the apex of the angle. The belt 1 is passed through the openings 4 and 5 in such a way that it will be situated on the side of the bar 6 facing away from the apex of the angle whereby the buckle member 3 is easily moved along the belt 1 at least when, upon retraction of the diagonal belt strap, said buckle member reaches the deflection fitting 2. By this arrangement the belt 1 is easily collected at the belt retracting device when the safety belt is not in use, thereby avoiding the occurrence of loosely hanging belt loops.

The opening 4 which is closest to the deflection fitting 2 has a relatively great extension in the longitudinal direction of the belt 1. As a result, the opening 4 can constitute the opening in a handle portion 8 associated with the buckle member 3.

On the side cooperating with the belt 1 and facing away from the apex of the angle, the bar 6 has a rounded surface 9. The opening 5 which is located below the bar 6 and has a relatively small extension in the longitudinal direction of the belt 1, is formed with an abutment surface 10 which is adapted to guide the belt 1 towards the rounded surface 9 of the bar 6 so that the smallest possible deviation of the strap arises, which is a prerequisite of keeping the required force F for pulling the belt towards the belt retracting device as small as possible.

As will appear from FIG. 1, the buckle member 3 is so configured with respect to the deflection fitting 2 that when said buckle member reaches the deflection fitting upon retraction of the diagonal belt strap, the bar 6 of the buckle member 3 will abut the deflection piece 11 of the fitting and the portion 12 of the buckle member, located above the bar 6, will abut a cover 13 or like protection for the fitting 2 with a view to maintaining the buckle member 3 fixed in a given position with respect to the deflection fitting 2. In said position the abutment surface 10 in the opening 5 shall make a certain angle a with the vertical plane extending through said opening. Said angle a is dependent upon the material of the belt and the material of the buckle member 3 with which the belt 1 shall engage. The angle a must therefore be established by experiments in each particular case. In one embodiment, the angle a shall be of the size shown in the drawing. If in this embodiment the angle a had been 0°, that is, if the abutment surface 10 had been vertical, the force F would have been doubled.

The opening 5, which more particularly is a gap, shall be narrower than a doubled belt 1 so that the buckle member 3 cannot change sides on the belt 1. Thus the opening 5 may be 2.5 mm in width, when the belt 1 has a thickness of 1.7 mm.

In the embodiment illustrated, the buckle member 3 is an angular sheet metal tongue, plastics material having been injection moulded onto the handle 8, the bar 6 and the opening 5 having the abutment surface 10. The portion of the sheet metal tongue which is to serve as the insertion tongue 7 is at least substantially coplanar with the handle portion 8, this being of importance to a convenient handling of the buckle member 3.

As will be apparent from FIG. 3 the bar 6 must not be laterally offset with respect to the outer edges of the openings 4 and 5 by such an amount that the belt 1 can extend straight through the buckle member 3, but some deviation must occur to determine the resistance to a displacement of the buckle member 3 along the belt 1.

The invention is not restricted to what has been described herein and illustrated in the drawing, but may be modified within the spirit and scope of the appended claims.

What I claim and desire to secure by Letters Patent is:

1. A safety belt, of the three-point type, the lap and diagonal straps of which in the position of the belt as fastened extend in V configuration transversely of the vehicle, said diagonal belt strap on one side of the seat of the vehicle being movably passed through a deflection fitting fixed to said one side, from where said strap runs into a belt retracting means which exerts a yielding pull on the belt, said lap belt strap being attached on said side to the seat or to the vehicle, the belt at the apex of the V configuration being movably passed in such a way through two spaced openings in a buckle member that the portion of the buckle member between the openings therein forms a bar located at the V apex and extending transversely of the belt, said buckle member being detachably connectable with a coupling means disposed on the other side of the vehicle seat, wherein the buckle member is so configured that the portions thereof formed with said spaced openings, make an angle with one another, said bar of the buckle member being located at the angle apex, the belt being passed in such a way through said openings that it will be situated on the side of the bar facing away from the angle apex whereby the buckle member is easily moved along the belt at least when said buckle member, upon retraction of the diagonal belt strap, reaches the deflection fitting, wherein the opening which is closest to the deflection fitting has a large extension in the longitudinal direction of the belt, said opening constituting the opening in a handle portion associated with the buckle member.

2. A safety belt as claimed in claim 1, wherein the bar of the buckle member is formed with a rounded surface on the side of said bar cooperating with the belt and facing away from the angle apex.

3. A safety belt as claimed in claim 2, wherein the opening facing away from the deflection fitting and having a relatively small extension in the longitudinal direction of the belt, is formed with an abutment surface which is adapted to guide the strap towards the rounded surface of the bar.

4. A safety belt as claimed in claim 1 wherein the buckle member is so configured with respect to the deflection fitting that when said buckle member reaches the deflection fitting upon retraction of the diagonal belt strap, the bar of said buckle member will abut the deflection piece of the fitting and the portion of said buckle member located above the bar will abut a cover or like protection for the fitting with a view to maintaining the buckle member fixed in a given position with respect to the deflection fitting.

5. A safety belt as claimed in claim 4, wherein the abutment surface in the opening facing away from the deflection fitting is adapted to make a certain angle ($\alpha$) with the vertical plane extending through said opening in the position the buckle member occupies at the deflection fitting.

6. A safety belt as claimed in claim 5, wherein the buckle member is formed with a tongue adapted for insertion in a coupling means, and being at least substantially coplanar with the handle portion of said buckle member.

* * * * *